United States Patent [19]

Peacher

[11] Patent Number: 4,757,265
[45] Date of Patent: Jul. 12, 1988

[54] ADAPTIVE ECCM SIGNAL PROCESSOR

[75] Inventor: Benjamin F. Peacher, Willingboro, N.J.

[73] Assignee: The United States of America as represented by the Secretary of the Air Force, Washington, D.C.

[21] Appl. No.: 202,039
[22] Filed: Nov. 24, 1971
[51] Int. Cl.⁴ .......................... H04B 15/00; G01S 7/36
[52] U.S. Cl. ......................................... 328/167; 342/17
[58] Field of Search ...................... 343/18 E; 455/296; 328/167

[56] References Cited

U.S. PATENT DOCUMENTS

| | | | |
|---|---|---|---|
| 3,118,140 | 1/1964 | Vladimir et al. | 343/18 E |
| 3,278,936 | 10/1966 | Wolf | 343/18 E |
| 3,597,762 | 8/1971 | DiMatteo | 343/18 E |

*Primary Examiner*—T. H. Tubbesing
*Assistant Examiner*—Gregory C. Issing
*Attorney, Agent, or Firm*—Julian L. Siegel; Donald J. Singer; Harry A. Herbert, Jr.

[57] ABSTRACT

An adaptive nonlinear processor in which the desired radar signal together with an interfering signal is mixing with a voltage controlled oscillator and fed to a dispersive filter, the output thereof being detected and converted into gating pulses for enabling a gate circuit that is also fed by the same dispersive filter. The gated output is frequency inverted and fed to a second dispersive filter which produces an inverse Fourier transform. The signal is then mixed with the delayed output of the voltage control oscillator and band pass filtered.

3 Claims, 2 Drawing Sheets

ADAPTIVE ECCM SIGNAL PROCESSOR

BACKGROUND OF THE INVENTION

This invention relates to radar signal processing and more particularly to a system for adaptive nonlinear processing of radar signals together with interference signals.

In the past there has been a demand for a system which could sense various forms of ECM (electronic countermeasures) and adaptively select optimum ECCM (electronic counter countermeasures) fixes to suppress a particular form of ECM or mixture of interference signals being encountered. The present invention supplies that need.

The present adaptive nonlinear processor is unique in that it can perform ECM sensing and ECCM fix selection in a completely automatic manner. These functions could previously be performed only by ECCM fixers selected by a human operator. The skill level required for real time ECM sensing and optimum ECCM fix selection in today's complex ECM environment, has surpassed that of the most experienced operator. Thus there is a need for a completely automatic signal processor.

This adaptive nonlinear processor is extremely versatile in that it is compatible with a large number of existing radar systems, e.g., the processor can be placed into the proper point in the signal flow path of existing radar systems and perform the required adaptive operation.

SUMMARY OF THE INVENTION

The adaptive nonlinear processor utilizes direct spectrum analyzer techniques followed by adaptive signal processing and inverse signal transformation to reject CW, swept, and spot noise jammers in a self-adaptive manner; and to provide ECM sensing information for decision making and command signal generation for optimum fix selection for suppression of barrage jammers, noncoherent repeaters, burst interference and clutter. The wide band desired signals are simultaneously processed with little loss of phase or amplitude information while the above operations are being performed.

It is an object of this invention to provide a novel and improved adaptive signal processor.

It is another object to provide a novel and improved system for rejecting CW, swept, and spot noise jamming in a self-adaptive manner.

It is still another object to provide a nonlinear processor that presents ECM sensing information for decision making.

These and other objects, advantages and features of the invention will become more apparent from the following description taken in connection with the illustrative embodiments of the accompanying drawings.

DETAILED DESCRIPTION OF THE PREFERRED EMBODIMENT

Figure 1:
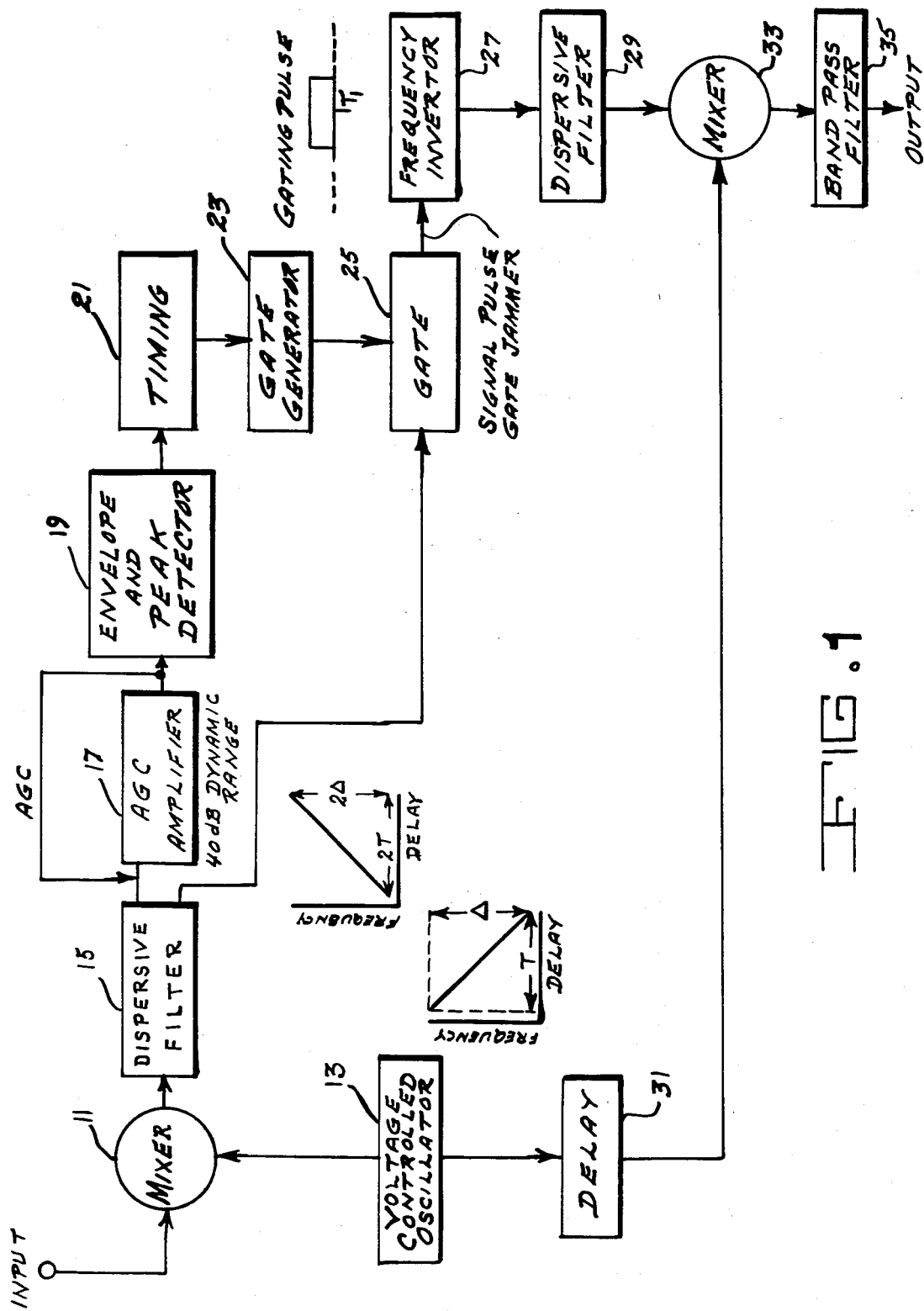
FIG. 1 is a block diagram showing an embodiment of the invention.
Figure 2:
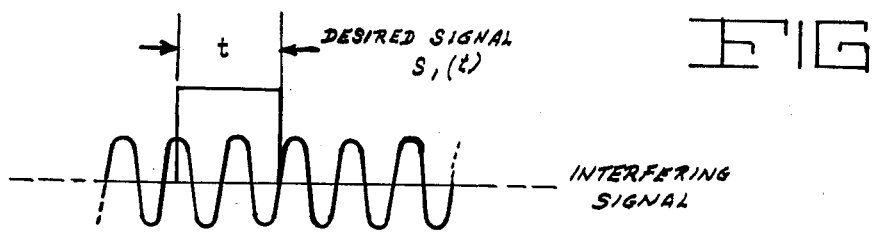
FIGS. 2-5 are waveforms associated with the embodiment and useful in the explanation of FIG. 1.
Figure 3:
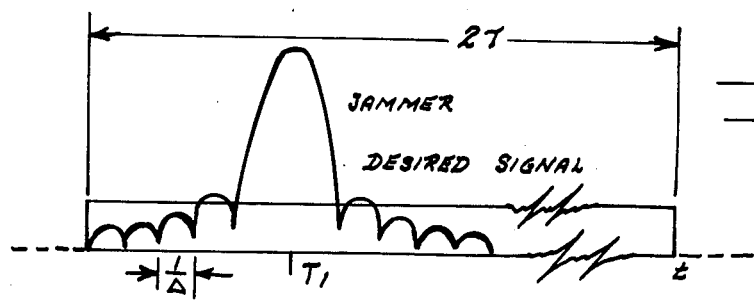

The adaptive nonlinear processor's functional components are shown in FIG. 1 with the waveform diagrams of FIGS. 2, 3, 4 and 5 used in the explanation thereof. The desired signal together with the interference signal (shown in FIG. 2) is fed to mixer 11 which is also fed by scanning voltage control local oscillator 13 having sweep time T. This converts the input CW interference signal into a chirp signal which is fed to dispersive filter 15. The swept frequency range $\Delta$ of voltage controlled oscillator is equal to one-half the bandwidth of filter 15. The chirp signal has a frequency delay slope equal and opposite to that of dispersive filter 15. The response of dispersive filter 15 to this signal is a pulse whose envelope is the Fourier transform of the input signal envelope with the change of variables $f = -kt$, where $k = \mu/T$. The desired wideband signal is modulated only a small amount due to its short duration $(\tau)$ and the output of first dispersive filter 15 is dispersed over the interval 2T and obtains the amplitude $\sqrt{\Delta'\tau}$ (assuming 0 db input level where $\Delta'$ is the linear frequency modulation of the desired signal after mixing with oscillator 13. It should be noted that if the input signal-to-jammer level is 0 db, the output signal-to-jammer level is $\Delta'\tau/\Delta T$ or $\tau/T$. Up to this point the system operation is similar to that of a Kencheloe spectrum analyzer.

Figure 4:
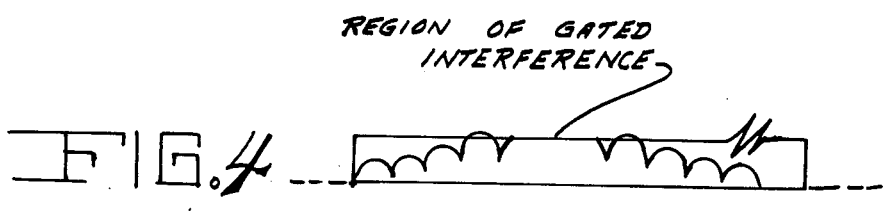

The signal is next processed in two separate channels. The upper channel forms the gating pulse necessary for jammer suppression. The signal from dispersive filter 15 is fed to automatic gain control amplifier 17 and then to envelope and peak detector 19. The detected signal is then fed to timing circuit 21 which controls gating generator 23. The position of the gating pulse is independent of jammer input level. In other words, an adaptive time gating limiting function is performed. The jammer plus the desired signal (shown in FIG. 3) in the lower channel arrives at gate 25 lagging by one repetition interval T of the periodic sweeping oscillator 13 and is simultaneous with the gating pulse formed in the upper channel. The output of gate 25 is shown in FIG. 4. Approximately 60 db suppression is obtained during the gating interval. As the gate width is increased, a larger portion of the jammer energy is rejected. If the main lobe plus first and second sidelobes of the jammer are gated out, then for a jammer sweep rate of 25 kH/$\mu$s (B=0.05), a 14 db gain in signal-to-jammer ratio is obtained for the case of no sidelobe weighting. Since the desired signal is much longer than the gate, it is perturbed very little by the gating action.

Figure 5:
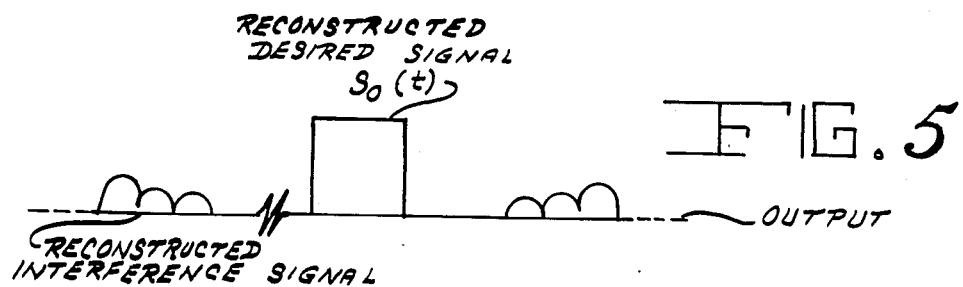

After frequency inversion by inverter 27 the desired signal is reconstructed by an inverse transformation in second dispersive filter 29 and mixed with the output of voltage controlled oscillator 13 through delay circuit 31 and mixer 33 and then fed to bandpass filter 35. The delay is equal to $\tau f_o$, the center frequency delay of filter 15. The final signal output is the inverse Fourier transform of the processed Fourier transform of the input signal. The desired signal is not affected by the limiting action, and the final output is shown in FIG. 5.

If Hamming weighting in the time domain is performed before first dispersive filter 15 a considerable improvement in swept jammer rejection is obtained. Hamming weighting is a technique for sidelobe weighting which places more signal energy around the main lobe response thereby allowing a larger percentage of jammer rejection for a given gatewidth.

What is claimed is:

1. A system for adaptive nonlinear processing of CW input signals, comprising:

a. a voltage controlled oscillator;

b. a first mixer fed by the input signals and the voltage controlled oscillator;

c. a first dispersive filter fed by the mixer and having a frequency slope equal and opposite of that of the voltage controlled oscillator;

d. a detector fed by the dispersive filter;

e. gate enabling means fed by the detector;

f. means for time gate limiting the output of the dispersive filter, the time gate limiting means being controlled by the gate enabling means;

g. a frequency inverter fed by the time gate limiting means;

h. a second dispersive filter fed by the frequency inverter;

i. a delay circuit fed by the voltage controlled oscillator;

j. a second mixer fed by the delay circuit and a second dispersive filter; and k. a bandpass filter fed by the second mixer.

2. A system for adaptive nonlinear processing according to claim 1 which further comprises an automatic gain control circuit interposed between the first dispersive filter and the detector.

3. A system for adaptive nonlinear processing according to claim 2 wherein the detector is an envelope and peak detector.

* * * * *